July 24, 1928.
W. H. ILLINGWORTH
1,678,187
ELECTRICAL CUT-OUT
Filed July 12, 1922
6 Sheets-Sheet 1
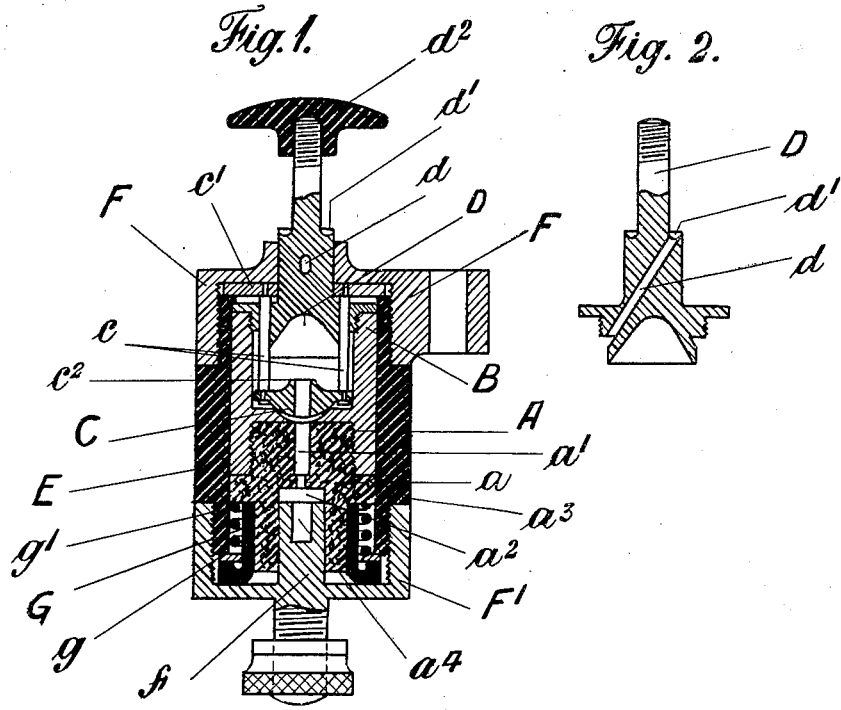
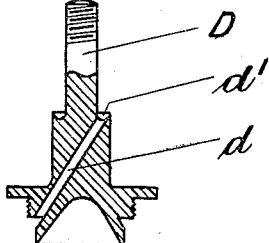
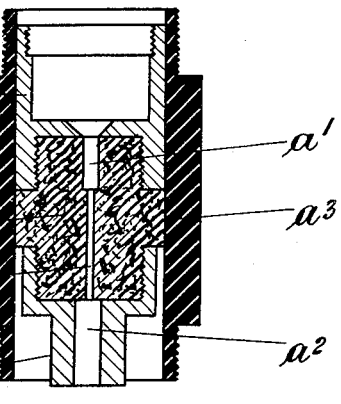
INVENTOR
Wm. H. Illingworth
by Herbert W. Jenner,
Attorney.

July 24, 1928.  1,678,187
W. H. ILLINGWORTH
ELECTRICAL CUT-OUT
Filed July 12, 1922  6 Sheets-Sheet 2
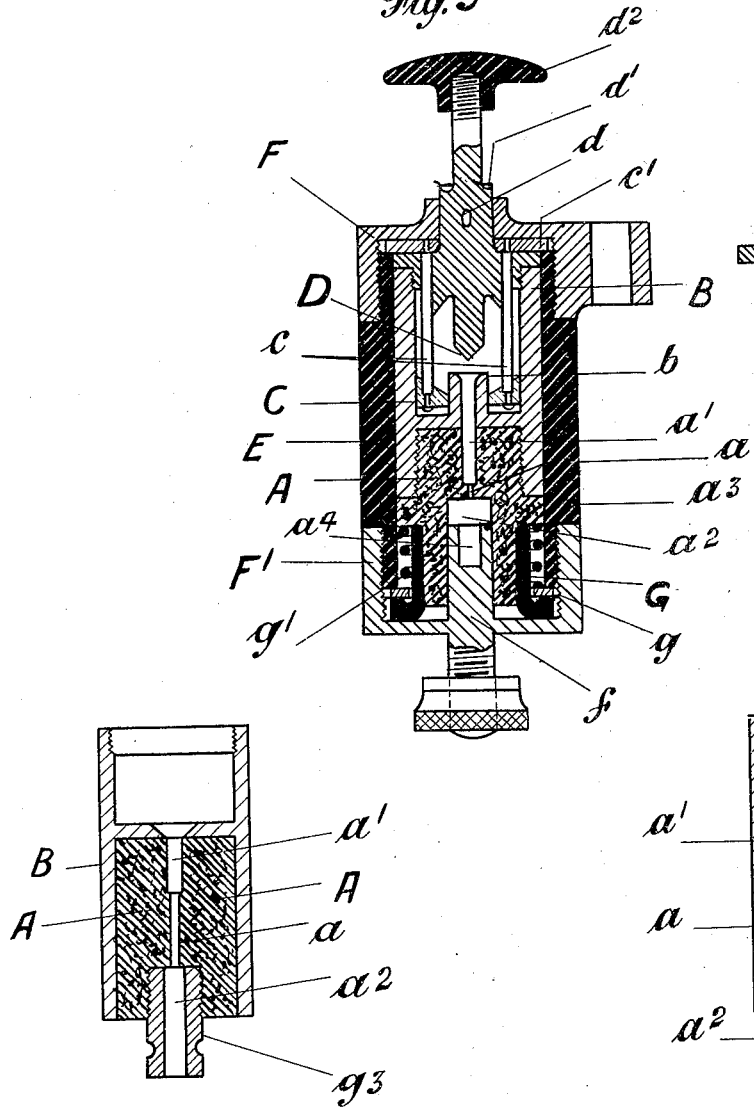
Fig. 3.
Fig. 6.
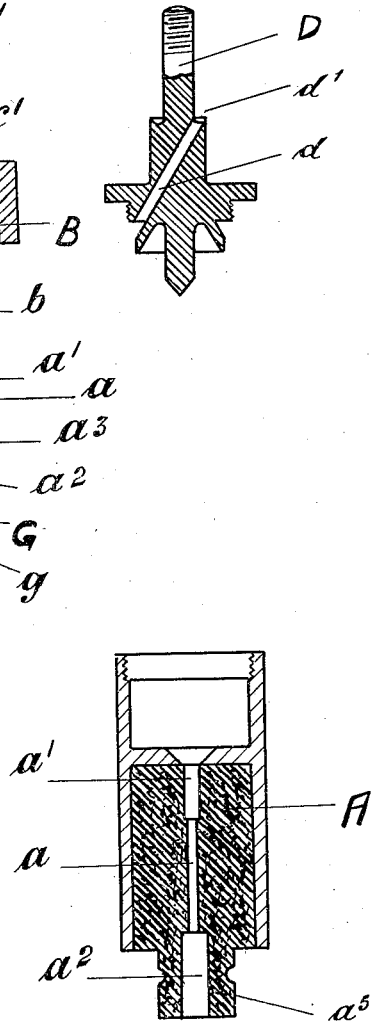
Fig. 4.
Fig. 7.
INVENTOR
Wm. H. Illingworth
by Herbert W. P. Jenner
Attorney.

July 24, 1928.

W. H. ILLINGWORTH 1,678,187

ELECTRICAL CUT-OUT

Filed July 12, 1922

INVENTOR.
Wm. H. Illingworth
by Herbert W. Jenner
Attorney.

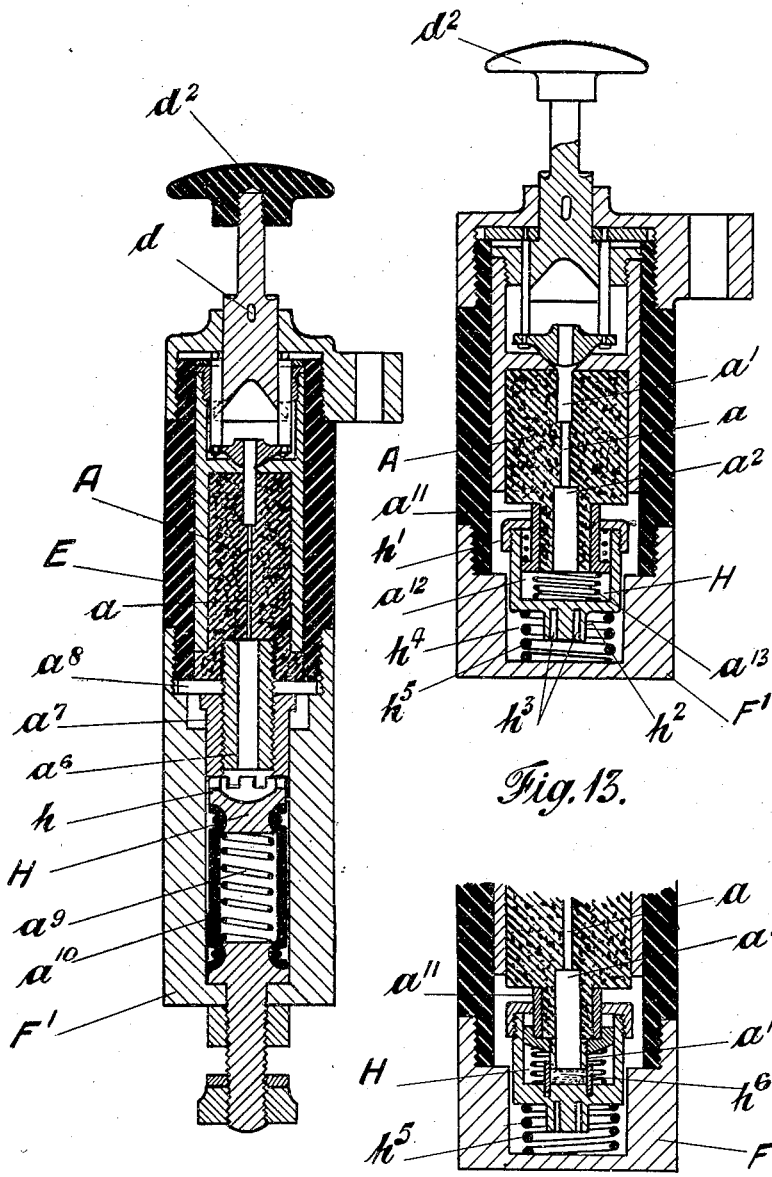

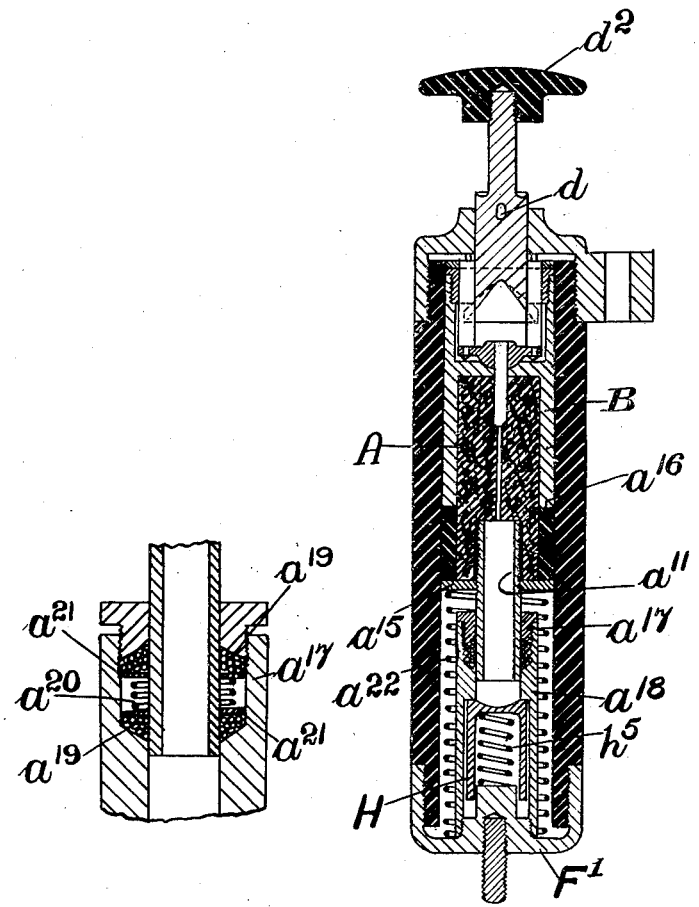

July 24, 1928.

W. H. ILLINGWORTH

ELECTRICAL CUT-OUT

Filed July 12, 1922

INVENTOR
Wm. H. Illingworth
by Herbert W. R. Jenner,
Attorney.

Patented July 24, 1928.

1,678,187

UNITED STATES PATENT OFFICE.

WILLIAM HENRY ILLINGWORTH, OF HALIFAX, ENGLAND.

ELECTRICAL CUT-OUT.

Application filed July 12, 1922, Serial No. 574,573, and in Great Britain September 26, 1921.

This invention relates to a non-fusible electrical cut-out such as that which is described in my prior Patents Nos. 1,316,095 and 1,392,873 and which can be used as a single unit, or in conjunction with a distribution board, or with an oil, or air break switch and with direct current, or alternating current in any of such applications, and which as already set forth in certain of the aforesaid patents entirely eliminates any surge, or sudden rush of current when a dead short circuit takes place and which invariably occurs when the circuit is under the control of a metal or a wire fuse, or a circuit breaker.
According to this invention, the cut-out when used as a single unit, or in conjunction with a distribution board is provided with means for trapping any mercury that is thrown out of the passage by a short circuit, or bad fault or overload and with means for re-establishing the circuit and for this purpose a stationary valve may be used to prevent return of mercury to the column and the core may be displaceably mounted in the carrier for effecting the re-establishment of the circuit, or the breaking of the column may be arranged to lift a float, or plunger which may actuate mechanism to release a spring which actuates a cap, or plunger to withdraw the column of mercury and prevent the latter from being accidentally remade until the trigger mechanism is re-set.

The core is advantageously manufactured from a high grade earth containing a large percentage of clay, say for example 90% and a small amount of felspar, silica and alkalies which have become intimately mixed with the clay during the course of nature, the said materials being entirely free of all metals, or metal forming substances, or any substances which when united, or combined with mercury or mercury vapour would set up fulminate of mercury. The clay to which an electrolyte has been added is treated electrically to extract certain impurities from the clay and render it capable of withstanding a higher temperature than it otherwise would, it also causes the clay to vitrify at 100° C. lower temperature than it would before being treated. The clay may be moulded under very high pressure in dust form, or in a plastic state, and the resultant cores are thoroughly dried in a temperature not exceeding 100° C. Two firings are essential, the first being very slow between the temperatures of 250° C. and 650° C. During the second firing the temperature is raised to 1,450° C. and when the firing is completed the cores are absolutely homogeneous and possess a very low percentage of porosity.

In applying the cut-out to a switch, an operating member is actuated by expansion, or breaking of the column to impart movement to trip mechanism for causing the switch to be moved to its "off" position.

In the accompanying drawings:—

Fig. 1 is a vertical section of an electrical cut-out constructed in accordance with this invention.

Fig. 2 is a detached section of a combined baffle and operating member taken at right angles to the corresponding part shown in Fig. 1.

Figs. 3 and 4 show a slightly modified form of apparatus to that shown in Figs. 1 and 2.

Figs. 5, 6 and 7 show alternative core constructions for use in connection with either of the cut-outs shown in Figs. 1 and 3.

Figs. 8, 9, 10, 11 and 12 shew various views of two insulating holders in which the cut-out shown in Figs. 1 and 3 is adapted to be encased.

Figure 8:
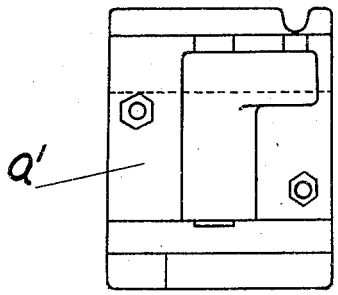
Figure 9:
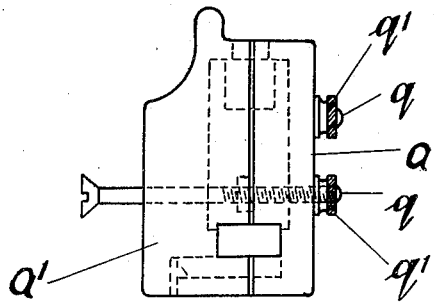
Figure 10:
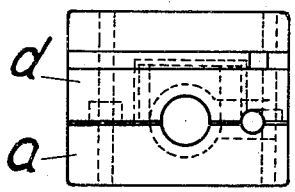
Figure 11:
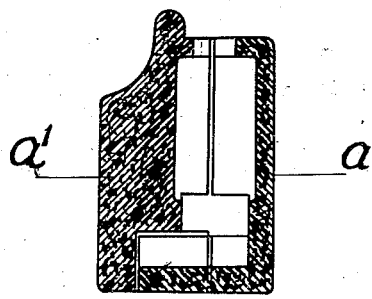
Figure 12:
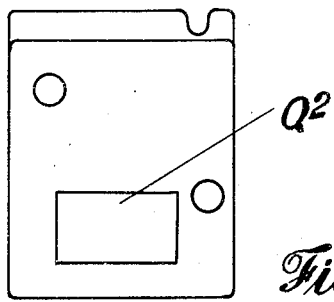

Fig. 12$^a$ is a vertical section of a cut-out provided with shock absorber.

Figure 13D:
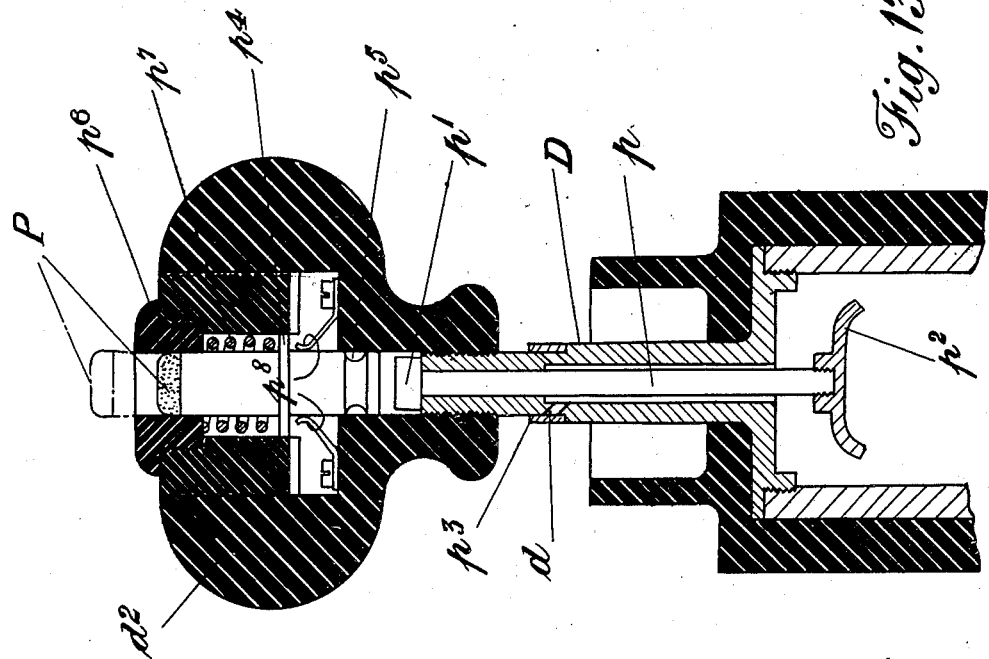
Figure 13E:
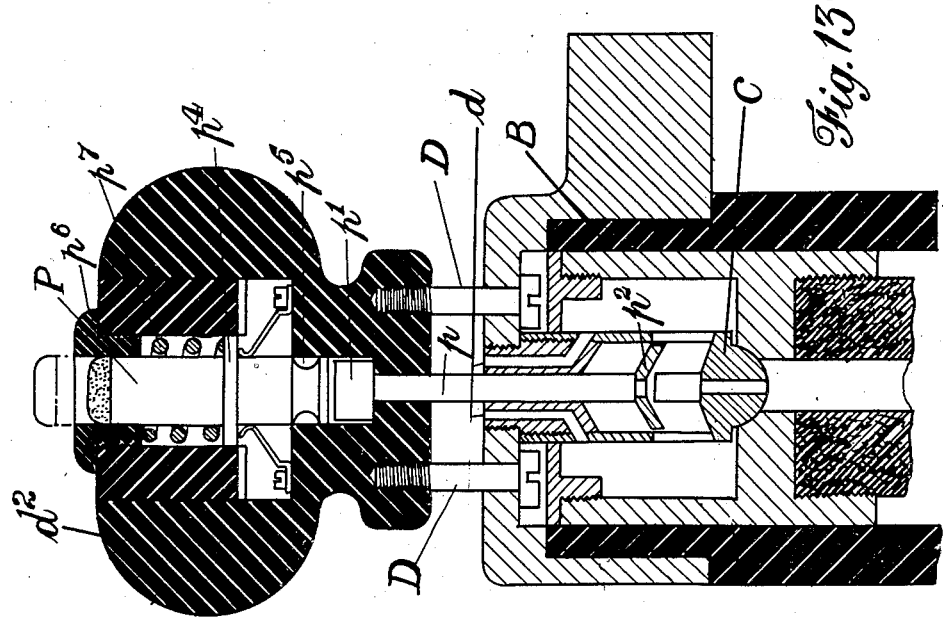

Fig. 13 is a similar view showing a modified form of shock absorber.

Figs. 13$^a$ and 13$^b$ are vertical sections showing two further modified forms of shock absorbers.

Fig. 13$^c$ is a section drawn to a larger scale showing a form of packing, and

Figs. 13$^d$ and 13$^e$ are vertical sections showing the cut-out fitted with an indicator to show when the circuit is broken.

In the example shown in Fig. 1 a core A of refractory material is formed with a restricted passage $a$ between two larger passages $a^1$ $a^2$ and extending around such core is a collar $a^3$. The upper portion of the core is threaded to screw or be cemented into a metal casing B which may be constructed from phosphor bronze. This casing constitutes a chamber and a seating for a stationary valve C which may also be constructed from phosphor bronze. This valve is loosely mounted on two rods $c$ which pass through the combined baffle and operating member D and are secured to a metal washer or collar $c^1$. The member D may be constructed from phosphor bronze and is screwed into the casing B and the latter together with the core A make a sliding fit in a body E which may be constructed from vulcanite, or other appropriate insulating material. This body is threaded at each end to receive two metal caps F F¹ which constitute the metal contacts. The upper cap is formed with a hole for the passage of the operating member D and when such cap is screwed into position it clamps the collar $c^1$ against the body E. Extending through the stem of the operating member D is a vent $d$ which advantageously terminates in a channel $d^1$ and fixed on the top of the operating member is a knob $d^2$ which may be constructed from vulcanite, or other appropriate insulating material. The lower cap F¹ is formed with a central stem $f$ which makes a sliding fit with the bore of the passage $a^2$ and is recessed at $a^4$ to give increased surface contact with the mercury. The portion of the core below the collar $a^3$ is encased by a rubber sleeve G which is flanged at the bottom as shewn and resting on such flanged portion is a metal washer $g$. The parts are normally maintained in the position shewn by a spring $g^1$ which exerts pressure between the collar $a^3$ and the washer $g$. If desired a telescopic arrangement may be substituted for the rubber sleeve. To utilize the apparatus it is charged with mercury, to or nearly to the top of the valve C and the top and bottom contacts are connected with the electrical circuit which it has to control. In the event of an overload, a short circuit, or a bad fault being set up, mercury in the restricted passage $a$ vaporizes and throws out the mercury that is above it against the baffle D, any gas that is generated by the vaporization of the mercury escaping through the vent $d$. The mercury so discharged collects on the top of the valve C and is prevented by a flange $c^2$ thereon from flowing back into the core passage and re-making the circuit. To re-make the circuit, the knob $d^2$ is depressed. This action forces down the casing B and core A against the action of the spring $g^1$. This movement moves the valve seating away from the valve C thereby allowing the mercury on the top of the valve to trickle back into the passage $a^1$. It also forces mercury in $a^2$ through the restricted passage $a$ to join the mercury in $a^1$ and flood the top of the valve seating. When the pressure on the knob $d^2$ is removed, the spring $g^1$ returns the parts to their normal position with the result that the mercury is drawn through the core in the opposite direction and ensures the remaking of a solid column. At the completion of the movement, the seating comes against the loosely mounted valve and closes the joint between such parts. In the modification shewn in Figs. 3 and 4 the casing B is formed with a tubular boss $b$ which passes through a hole in the valve C and makes a sliding fit therewith. The baffle D is also modified in shape, but its object is the same, namely to deflect the mercury to the sides of the chamber so that it will not drop back into the passage $a^1$. In this construction when the knob $d^2$ is depressed, the top of the tubular boss $b$ comes level with, or below the top of the valve C, and allows any mercury that has collected on the top of the valve to flow back into the passage $a^1$. If desired the lower portion of the core may be threaded (Fig. 5) to carry a metal sleeve, or socket $g^2$ to receive the central stem $f$ and take the pressure exerted by the spring $g^1$. In a modified construction the collar $a^3$ may be dispensed with and the casing B may extend to the bottom of the core as shewn in Fig. 6. A metal thimble $g^3$ may be screwed into the bottom of the $g^2$ for connection with the rubber sleeve G, or the bottom of the core may be formed with a boss $a^5$ (Fig. 7) for connection with such sleeve. Instead of the lower portion of the core being encircled by a rubber sleeve it may be encircled by a sliding telescopic chamber, with an oil or other flexible seal to seal the joint.

The cut-out described may be clamped between two porcelain or other insulating holders Q, Q¹ Figs. 8 to 11. This is conveniently effected by bolts $q$ and milled nuts $q^1$. The bolts $q$ secure the rear portions of the holders to an insulating base and the milled nuts $q^1$ can be actuated to perform the clamping operations, or be removed to enable the front portion Q to be taken off without disturbing the rear portion. The front portion Q² can be left unglazed and be marked with the particular circuit that that particular cut-out controls, it also serves to cover the metallic, or live part of the cartridge.

In the modification shewn in Fig. 12ᵃ a shock absorber H is provided to yield or give way when a short circuit, or a bad fault arises and so reduce the internal strain in the core A. For this purpose a phosphor bronze, or other suitable tube $a^6$ is screwed or cemented into the bottom of the core and on such tube is screwed a phosphor bronze or other suitable nut $a^7$ between which and the core A a rubber washer $a^8$ is clamped. This washer makes a tight joint between the body E and the cap F¹. The shock absorber H comprises a phosphor bronze cap that is castellated, or formed with apertures $h$ around its upper edge and such cap is normally retained in contact with the bottom of the nut $a^7$ by a spring $a^9$ that is encircled by a rubber tube $a^{10}$. This tube is surrounded by mercury which makes electrical contact with the cap F¹. By this construction when the column parts owing to a short circuit, or a bad fault, the sudden generation of gas forces down the phosphor bronze cap H and as the upper end of the core passage is in open communication with the atmosphere, the strain within the core is reduced to a minimum. To re-make the column, the knob $d^2$ is depressed, thereby forcing the core A, and $a^7$ and shock absorber H downwards, the rubber washer $a^8$ yielding and stretching to allow such movement. This displaces the mercury that surrounds the rubber tube $a^{10}$ and causes it to flow through the aperture $h$ and up through the core when it again joins the mercury that had been thrown out of the core passage above the restricted portion $a$.

In the modified form of shock absorber shewn in Fig. 13 a phosphor bronze, or other suitable tube $a^{11}$ is cemented, or otherwise fixed to the core A. This tube is flanged at $a^{12}$ to fit the bore of a cylinder H that is closed by a cap $h^1$ which fits the tube $a^{11}$. The cylinder H is provided with a boss or plunger $h^2$ in which is a recess $h^3$. The cylinder so formed is slidably mounted in a recess $h^4$ formed in the bottom cap $F^1$ and acts as a shock absorber through the intervention of a spring $h^5$ and a body of thick insulating oil which is contained in the recess $h^4$. The core is normally retained in its upper position by a spring $a^{13}$ which is weaker than the spring $h^5$ and interposed between the flange $a^{12}$ and the cap $h^1$ is a small body of insulating oil which is not sufficient to impede the movement of the shock absorber H. When the latter is forced down by generation of gas in the mercurial column, the spring $h^5$ is compressed and insulating oil that is displaced by the boss or plunger $h^2$ compresses air in the recess $h^3$. To remake the circuit, the knob $d^2$ is depressed, thereby lowering the core and displacing the mercury in the cylinder H. Instead of the latter being filled with mercury as shewn in Fig. 13, it may have a central chamber $h^6$ Fig. 13$^a$ for the mercury and the collar $a^{11}$ may be fitted with a tube $a^{14}$ arranged to make a telescopic joint with the wall of the chamber $h^6$, the interior of the chamber H being filled with insulating oil to a level that covers the top of the chamber $h^6$.

In the modification shewn in Fig. 13$^b$ the tube $a^{11}$ is advantageously constructed from steel and cemented or otherwise fixed in the core and provided with a metal disc $a^{15}$ which is insulated from the metal casing B by a ring $a^{16}$ of insulating material. The tube $a^{11}$ passes through a stuffing box $a^{17}$ in a tube $a^{18}$ that may be constructed from phosphor bronze and is screwed on to a central boss in the bottom cap $F^1$. The packing $a^{19}$ Fig. 13$^c$ in the stuffing box is advantageously made in two portions kept separate by a spring $a^{20}$ which exerts pressure against two washers $a^{21}$. Encircling the tube $a^{18}$ is a spring $a^{22}$ which exerts pressure against the metal disc $a^{15}$ and normally retains the core in its upper position. Mounted in the tube $a^{18}$ and making a sliding fit therewith and with the boss on the bottom cap $F^1$ is a hollow plunger H which constitutes the shock absorber and is retained in its upper position by a spring $h^5$ that is made stronger than the spring $a^{22}$.

Figs. 13$^d$ and 13$^e$ shew the knob $d^2$ fitted with an indicator P that is automatically actuated by vaporization of mercury in the passage $a$ to rise above the top of the knob $d^2$ and remain in this position thereby indicating that the circuit is broken. In Fig. 13$^d$ a rod $p$ is slidably mounted in relation to this knob $d^2$ and has a head $p^1$ at the top and a plate or valve $p^2$ at the bottom. This rod passes through the stem of the operating member D and one or more vents $d$ in the latter are closed by a spring clip $p^3$. The indicator P is slidably mounted in the knob and comprises a plunger having a flange $p^4$ and an annular groove $p^5$. Interposed between the flange $p^4$ and a cap $p^5$ is a spring $p^7$ which normally tends to keep the plunger in the position shewn. When the mercury vaporizes, the rod $p$ is forced up by the action of the mercury on the plate or valve $p^2$. The head $p^1$ strikes the bottom of the indicator and forces the latter up against the action of the spring $p^7$ until the annular groove is engaged by spring clips $p^8$ which retain the plunger in its raised position. Gas generated by vaporization of mercury escapes through the vent $d$ and the rod $p$ returns to the position shewn by gravity. To remake the circuit, the indicator P is pushd flush with the top of the knob and the downward movement of the latter is completed in the ordinary way. As the indicator is pushed flush with the top of the knob, the annular groove $p^5$ disengages the spring clips $p^8$ and the spring $p^7$ forces the indicator down to the position shewn. Should a fault, or overload occur whilst the knob is being pressed down, the apparatus will operate in the manner described and the indicator will strike the finger or hand of the operator. The portion of the indicator which projects above the top of the knob may be painted red. The apparatus shewn in Fig. 13$^e$ is the same as that described with reference to Fig. 13$^d$ with the exception that the rod $p$ is mounted in the casing of a fixed valve C and the knob $d^2$ transmits motion to the casing B through the action of screws D which in this case constitute the operating member. The upper part of the valve casing is formed with a vent $d$ for the escape of gas to the atmosphere.

What I claim as my invention and desire to secure by Letters Patent in the United States is:—

1. In an electrical cut-out in which a column of conducting liquid constitutes the circuit breaking element, the combination of a tubular body, a metal contact situated at each end of such body, a chamber slidably mounted in the tubular body, a tubular core of refractory material rigidly connected to such chamber, a valve stationarily mounted in the chamber, a spring for retaining the chamber in a raised position in relation to such valve, and externally operated means for depressing the chamber and core against the action of the spring.

2. In an electrical cut-out in which a column of conducting liquid constitutes the circuit breaking element, the combination of a tubular body, a metal contact situated at each end of such body, a chamber slidably mounted in the tubular body, a tubular core of refractory material rigidly connected to such chamber, a valve stationarily mounted in the chamber, a spring for retaining the chamber in a raised position in relation to such valve, means for making a seal between the core and the tubular body, and externally operated means for depressing the chamber and core against the action of the spring.

3. In an electrical cut-out in which a column of conducting liquid constitutes the circuit breaking element, the combination of a tubular body, a metal contact situated at each end of such body, a chamber slidably mounted in the body, a tubular core of refractory material rigidly connected to such chamber and having a tubular passage for the column of the conducting liquid restricted at some intermediate portion of its length, a valve stationarily mounted in the chamber, a spring for retaining the chamber in a raised position in relation to such valve, and externally operated means for depressing the chamber and core against the action of the spring.

4. In an electrical cut-out in which a column of conducting liquid constitutes the circuit breaking element, the combination of a tubular body, a metal contact situated at each end of such body, a chamber slidably mounted in the tubular body, a tubular core of refractory material rigidly connected to such chamber, a spring for retaining the chamber and core in a raised position and externally operated means for depressing the chamber and core against the action of the said spring.

5. In an electrical cut-out in which a column of conducting liquid constitutes the circuit breaking element, the combination of a tubular body, a metal contact situated at each end of such body, a chamber slidably mounted in the tubular body, a tubular core of refractory material rigidly connected to such chamber, a spring for retaining the chamber and core in a raised position, externally operated means for depressing the chamber and core against the action of a spring and a seal for preventing escape of mercury.

6. In an electrical cut-out in which a column of conducting liquid constitutes the circuit breaking element, the combination of a tubular body, a metal contact situated at each end of such body, a chamber slidably mounted in the tubular body, a tubular core of refractory material rigidly connected to such chamber, and having a portion of the bore formed with a restricted area, a spring for retaining the chamber and core in a raised position and externally operated means for depressing the chamber and core against the action of the said spring.

7. In an electrical cut-out in which a column of conducting liquid constitutes the circuit breaking element, the combination of a tubular body, a metal contact situated at each end of such body, a chamber slidably mounted in the tubular body, a tubular core of refractory material rigidly connected to such chamber and having a portion of the bore formed with a restricted area, a spring for retaining the chamber and core in a raised position, externally operated means for depressing the chamber and core against the action of the said spring and a seal for preventing escape of mercury.

8. In an electrical cut-out in which a column of conducting liquid constitutes the circuit breaking element, the combination of a tubular body, a metal contact situated at each end of such body, a chamber slidably mounted in the tubular body, a tubular core of refractory material rigidly connected to such chamber and having a portion of the bore formed with a restricted area, a valve stationarily mounted in the chamber, a spring for retaining the chamber in a raised position in relation to such valve, and externally operated means for depressing the chamber and core against the action of the spring.

In testimony whereof I affix my signature.

WILLIAM HENRY ILLINGWORTH.